(12) United States Patent
Kishimoto

(10) Patent No.: US 10,974,655 B2
(45) Date of Patent: Apr. 13, 2021

(54) AUTOMOTIVE REAR CONSOLE

(71) Applicant: Toyota Jidosha Kabushiki Kaisha, Toyota (JP)

(72) Inventor: Kengo Kishimoto, Miyagi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 71 days.

(21) Appl. No.: 16/424,959

(22) Filed: May 29, 2019

(65) Prior Publication Data

US 2019/0366934 A1 Dec. 5, 2019

(30) Foreign Application Priority Data

Jun. 5, 2018 (JP) .............................. JP2018-107508

(51) Int. Cl.
*B60R 7/04* (2006.01)
*B60N 2/75* (2018.01)
*B60R 11/00* (2006.01)

(52) U.S. Cl.
CPC ................ *B60R 7/04* (2013.01); *B60N 2/793* (2018.02); *B60R 2011/0007* (2013.01)

(58) Field of Classification Search
CPC .. B60R 7/04; B60R 2011/0007; B60R 21/055

USPC .............. 296/24.34, 37.8; 188/371, 376, 377
See application file for complete search history.

(56) References Cited

U.S. PATENT DOCUMENTS 9,199,595 B2 * 12/2015 Yano ..................... B60R 21/055
9,211,845 B2 * 12/2015 Yano ......................... B60R 7/04
9,925,927 B2 * 3/2018 Ogawa ..................... B60K 1/04

FOREIGN PATENT DOCUMENTS

| JP | 2010-030555 A | 2/2010 |
| JP | 2012-245844 A | 12/2012 |
| JP | 2014-205375 A | 10/2014 |

* cited by examiner

*Primary Examiner* — Dennis H Pedder
(74) *Attorney, Agent, or Firm* — Dinsmore & Shohl LLP

(57) ABSTRACT

An automotive rear console includes a rear console body fixed to a bracket provided on a floor between a driver's seat and a passenger seat inside a cabin of an automobile, wherein: the rear console body has a rectangular shape having a bottom portion; the rear console body includes fragile portions provided in a rear side of the bottom portion in a vehicle front-rear direction, in one side of the bottom portion in a vehicle width direction, and in the other side of the bottom portion in the vehicle width direction; and the fragile portions are configured to be broken when impact load is applied from above the rear console body.

6 Claims, 4 Drawing Sheets

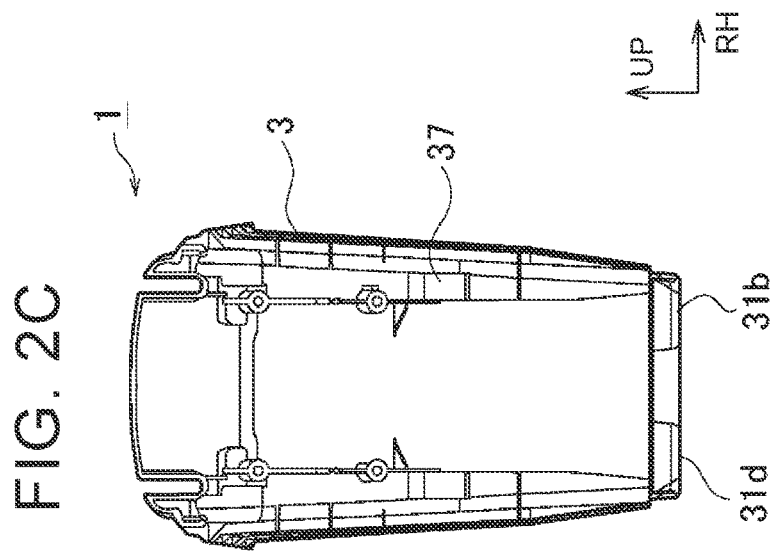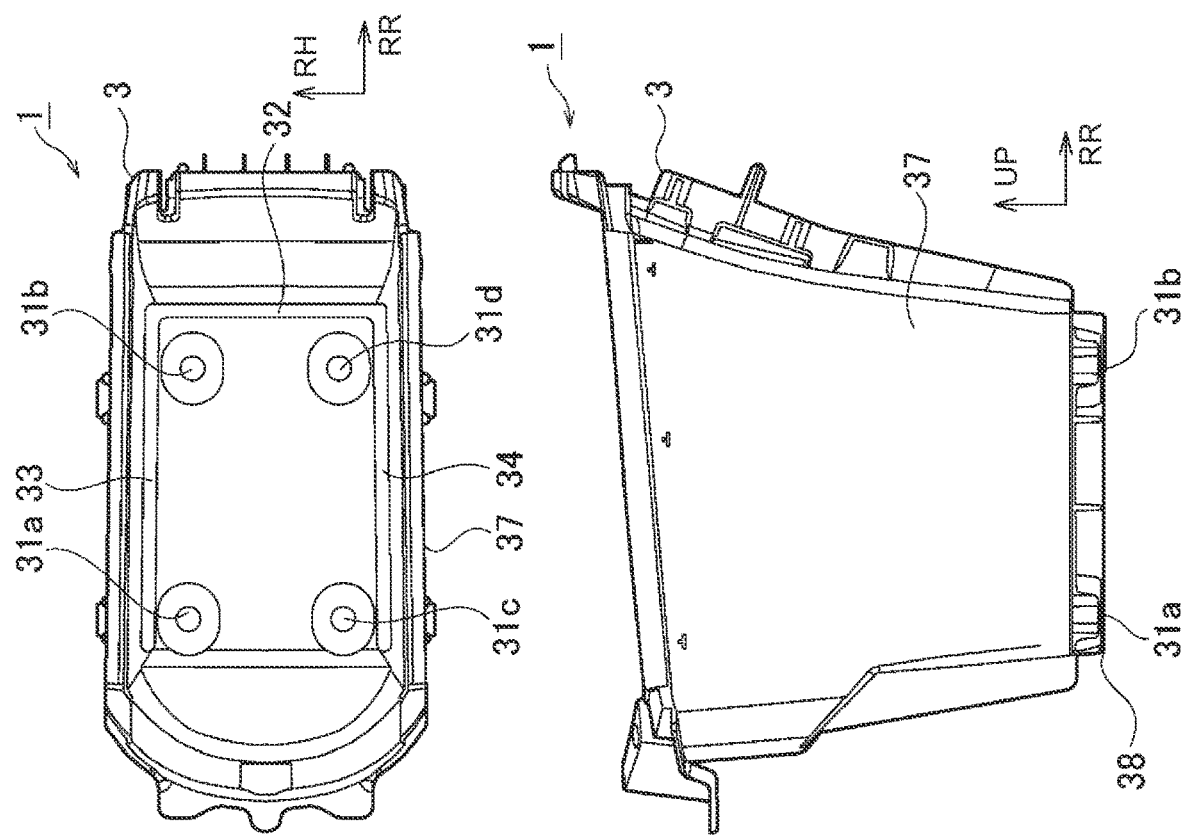

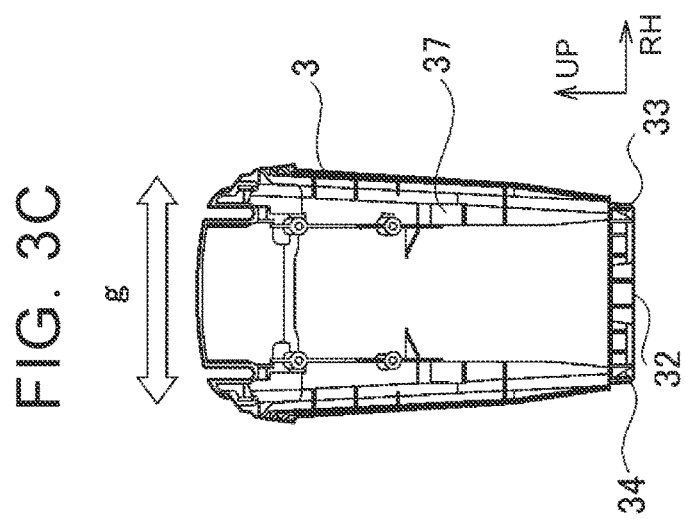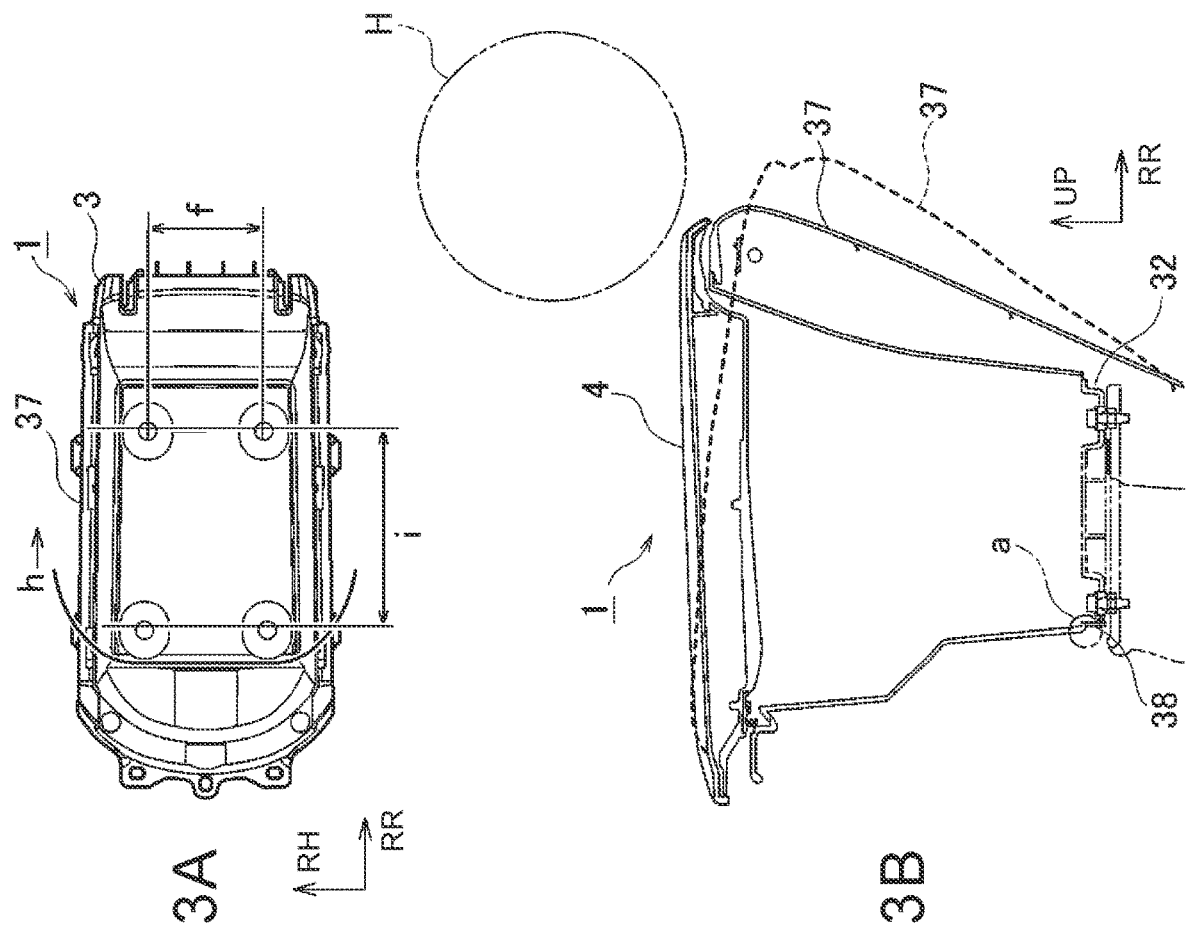

AUTOMOTIVE REAR CONSOLE

CROSS-REFERENCE TO RELATED APPLICATIONS

This application claims priority to Japanese Paint Application No. 2018-107508 filed on Jun. 5, 2018, which is incorporated herein by reference in its entirety including the specification, drawings and abstract.

BACKGROUND

1. Technical Field

The disclosure relates to an automotive rear console.

2. Description of Related Art

A rear console has been developed which is fixed to brackets by bolts and so on, the brackets being provided in a floor part between a driver's seat and a passenger seat in a cabin of an automobile. Some brackets that fix a rear console to a floor are reinforced in order to restrain deformation of a cabin at the time of side collision.

As such a rear console, for example, a rear console is disclosed that is provided with a box for storing small items, and a bottom wall portion and side wall portions of the box are covered by a surface panel from an outer side (see Japanese Unexamined Patent Application Publication No. 2010-30555 (JP 2010-30555 A)). In the bottom wall portion of the box, a contact portion and a fragile portion are formed. The contact portion projects downwardly and comes into contact with the bracket on a side of a vehicle body. The fragile portion is positioned at the rear of the contact portion and can be broken by an inroad load acting on a rear end portion of the rear console from above.

Further, a vehicle interior member provided with a plurality of first vertical ribs and second vertical ribs is disclosed. The first vertical ribs project in a rear portion of a fixed portion of a bottom plate portion in a console body mounted on a support bracket provided in the vehicle body, and extend in a front-rear direction. The second vertical ribs project in parallel to the first vertical ribs from a movable portion connected with the bottom plate portion of the console body, and are positioned between the first vertical ribs in a vehicle width direction, respectively (see Japanese Unexamined Patent Application Publication No. 2014-205375 (JP 2014-205375 A)). Each of the second vertical ribs projects so that a front end portion of each of the second vertical ribs is positioned on a front side of rear end portions of the neighboring first vertical ribs, and rear portions of the first vertical ribs and front portions of the second vertical ribs overlap in the vehicle width direction.

A rear fragile portion is provided in the rear portion of the bottom plate portion. The rear fragile portion is made of a groove disposed in a zigzag shape in a plan view so that the rear fragile portion passes between the rear end portions of the first vertical ribs and the front end portions of the second vertical ribs, and extends in the vehicle width direction. Further, a left fragile portion is provided in a left portion of the bottom plate portion. The left fragile portion extends in the front-rear direction from the vicinity of a rear edge of the bottom plate portion along a left edge of the bottom plate portion. Further, a right fragile portion is provided in a right portion of the bottom plate portion and extends in the front-rear direction from the vicinity of the rear edge of the bottom plate portion along a right edge of the bottom plate portion.

SUMMARY

However, only with the reinforced brackets, it becomes difficult to achieve an impact absorbing structure as well. In particular, when a floor is made as an absorbing structure, contradictory to vehicle rigidity arises.

Further, in the rear console disclosed in JP 2010-30555 A, since the fragile portion is provided in a lower portion of the rear portion of the box, an impact, absorption range becomes narrow.

In the rear, console in JP 2010-30555 A, when a fastening position of the box and the bracket on the vehicle body side is disposed near the center of the box in a plan view, it is possible to set a wide range of the fragile portion. However, rigidity of the box against hand pushing becomes low, and it is thus not possible to achieve the contrary performances.

Also, when the fastening position of the box and the bracket on the vehicle body side is disposed at four corners of the box in the plan view in order to enhance rigidity against hand pushing, it is possible to enhance rigidity of the box against hand pushing, but a sufficient range of the fragile portion cannot be ensured. Therefore, it is not possible to achieve the contrary performances.

In the vehicle interior member according to JP 2014-205375 described in the related art, the fragile portion is set only in a half on the rear side. Therefore, the impact absorption range becomes narrow.

Further, since the fragile portion is formed as a V-notch, when a console door is opened or closed or an elbow is rested or leaned on the console door repeatedly, positions where stress is applied are concentrated on a single point, and stress concentration and stress release happen repeatedly. Thus, a material of a distal end of the sharp angle notch may be deteriorated.

The disclosure provides an automotive rear console that sufficiently absorbs an impact force when an impact load is applied to a rear console body, and restrains a fragile portion from having stress concentration and stress release repeatedly.

An automotive rear console according to a first aspect of the disclosure includes a rear console body fixed to a bracket provided on a floor between a driver's seat and a passenger seat inside a cabin of an automobile, wherein: the rear console body has a rectangular shape having, a bottom portion; the rear console body includes fragile portions provided in a rear side of the bottom portion in a vehicle front-rear direction, in one side of the bottom portion in a vehicle width direction, and in the other side of the bottom portion in the vehicle width direction; and the fragile portions are configured to be broken when impact load is applied from above the rear console body.

According to the first aspect of the disclosure, when an impact load is applied to the rear portion of the rear console body from above, the fragile portions in the both right and left sides as well, as the rear side are broken, and the rear console body can be deformed by using the bottom portion of the front side as a center of rotation. Thus, it is possible to increase an impact absorbing capacity.

In the foregoing aspect, the rear console body may include a general portion which is the other portion of the rear console body than the fragile portions, each of the fragile portions may have a cutout portion in which a sectional shape perpendicular to the bottom portion has a step shape, and horizontal portion of the cutout portion may have a thin portion with a thickness smaller than a thickness of the general portion.

With the foregoing configuration, the horizontal portion of the cutout portion of the fragile portion is made of the thin portion that is thinner than the general portion of the rear console body. Since the thin portion is the horizontal portion, positions in the fragile portion where stress is applied are not concentrated on one point, and it is this possible to restrain having stress concentration and stress release repeatedly.

In the foregoing aspect, a thickness of the thin portion may be set based on a size of a region of each of the fragile portions and a material of each of the fragile portions. With the foregoing configuration, it is possible to enhance design freedom of the rear console body.

In the foregoing aspect, a front side of the bottom portion in the vehicle front-rear direction may have a shape so that the rear console body deforms by rotating about the front side as a center of rotation when a given impact load is applied.

With the foregoing configuration, due to a clear difference in strength in a thickness direction, when an impact load is applied to the rear portion of the rear console body from above and the fragile portions in the rear side and the both right and left sides are broken, it is possible to deform the rear console body stably by using the front side of the bottom portion as a center of rotation.

In the foregoing aspect, a shape of the front side in a thickness direction may have an arc shape on an outer diameter side and an angular shape on an inner diameter side. With the foregoing configuration, the inner diameter side can be formed into an acute angle, and the rear console body is thus easily rotated about the front side of the bottom portion.

In the foregoing aspect, the rear console body may include: a front surface in the vehicle front-rear direction; a rear surface in the vehicle front-rear direction; the bottom portion connecting a lower end of the front surface and a lower end of the rear surface; a first side surface connecting an end of the font surface on one side in the vehicle width direction and an end of the rear surface on the one side in the vehicle width direction; and a second side surface connecting an end of the front surface on the other side in the vehicle width direction and an end of the rear surface on the other side in the vehicle width direction.

In the foregoing aspect, the rear console body may include the fragile portions and a general portion which is other portion of the rear console body than the fragile portions, and a strength against the impact load of each of the fragile portions may be lower than a strength against the impact load of the general portion.

With the automotive rear console according to the above aspects, even when an impact load is applied to the rear console body due to sudden stop or a frontal collision of a vehicle, the impact force is sufficiently absorbed. Further, it is possible to restrain repeated stress concentration and stress release.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2A is a view of the automotive rear console in FIG. 1A, and is a bottom view of the automotive rear console;

FIG. 2B is a view of the automotive rear console in FIG. 1A, and is a left side view of the automotive rear console;

FIG. 2C is a view of the automotive rear console according to FIG. 1A, and is a back view of the automotive rear console;

FIG. 3A is a view describing an acting state of the automotive rear console according to the disclosure, and is a bottom view of the automotive rear console;

FIG. 3B is a view describing an acting state of the automotive rear console according to the disclosure, and is a sectional view of the automotive rear console seen from a left side surface;

FIG. 3C is a view describing an acting state of the automotive rear console according to the disclosure, and is a back view of the automotive rear console.

DETAILED DESCRIPTION OF EMBODIMENTS

Figure 1A:
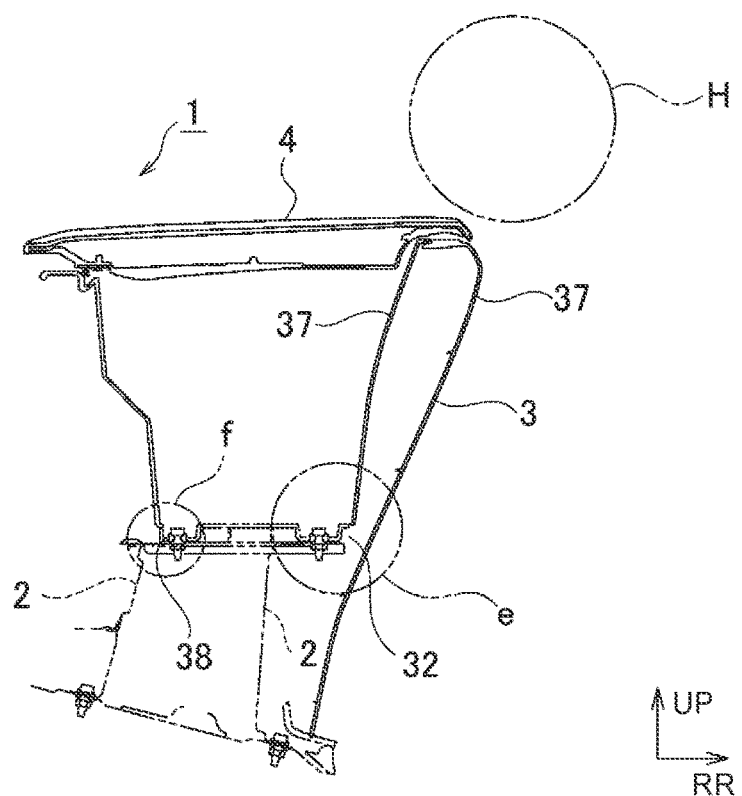
FIG. 1A is a view of an embodiment of an automotive rear console according to the disclosure, and is a side sectional elevation of the automotive rear console.

Hereinafter, an embodiment of an automotive rear console according to the disclosure is described with reference to the drawings. In the drawings, the sign "UP" refers to an upper side in a vehicle up-down direction, the sign "RR" refers to a rear side in a vehicle front-rear direction, and the sign "RH" refers to a left side in a vehicle width direction. As shown in FIG. 1A, FIG. 2A, FIG. 2B, and FIG. 2C, in the automotive rear console according to the disclosure, a rear console body 3 is fixed by bolts and so on to console mounting brackets 2 provided on a floor part between a driver's seat and a passenger seat inside a cabin of an automobile.

The automotive rear console 1 according to the disclosure includes the rear console body 3 and a lid portion 4. The rear console body 3 has a rectangular recessed shaped storage part in which an opening is formed in an upper surface. The lid portion 4 is attached to the rear console body 3 through a hinge and so on (not shown) and is able to open and close the opening. In FIG. 2A, FIG. 2B, and FIG. 2C, the lid portion 4 is not shown for convenience.

The rear console body 3 has a front surface in the vehicle front-rear direction, a rear surface in the vehicle front-rear direction, a bottom portion 38 connecting the lower end of the front surface and the lower end of the rear surface, and both side surfaces each of which connects the side ends of the front surface and the rear surface in the vehicle width direction, and is formed into a rectangular shape in a plan view. Specifically, one of the side surface connects one ends of the front surface and the rear surface in the vehicle width direction. The other side surface connects the other ends of the front surface and the rear surface. The bottom surface 38, the front surface, the rear surface, and the both side surfaces are made from, for example, a resin material such as polypropylene, and are formed integrally by injection molding. In a bottom portion (the bottom surface) of the rear console body 3, mounting seats 31a, 31b, 31c, 31d are provided at four corners, respectively, and the console mounting brackets 2 are provided in the floor part corresponding to the mounting seats 31a, 31b, 31c, 31d, respectively.

Figure 1B:
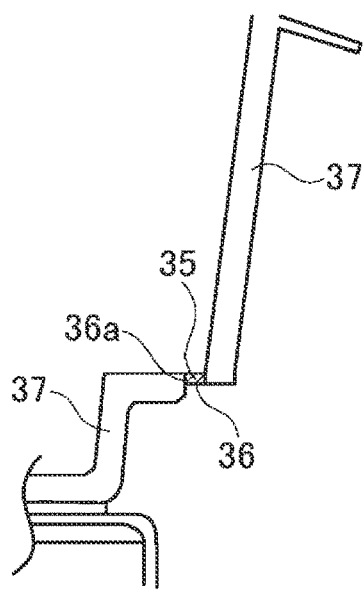
FIG. 1B is a view of the embodiment of the automotive rear console according to the disclosure, and is a detailed enlarged view of a portion e of FIG. 1A.

In the rear console body 3, fragile portions 35 are provided in a rear side 32 of the bottom portion in the vehicle front-rear direction, and in both left and right sides 33, 34 of the bottom portion in the vehicle width direction, respectively. The fragile portions 35 break when a given impact load H is applied from above. The fragile portions 35 are formed into cutout portions 36 that have a step-shaped sectional surface perpendicular to the bottom portion. This means that the cutout portion 36 is made by cutting out the bottom portion on an outer peripheral side. Also, as shown in FIG. 1B, a thin portion 36a with a thickness smaller than that of a general portion 37 of the rear console body 3 is formed in a horizontal portion of the cutout portion 36. The thin portion 36a is optimized and set based on a deformation region and a material of the fragile portions 35 of the rear console body 3.

Figure 1C:
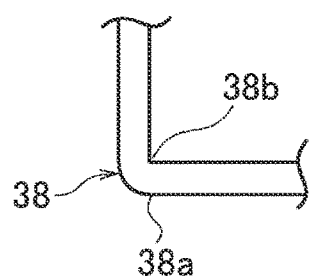
FIG. 1C is a view of the embodiment of the automotive rear console according to the disclosure, and is a detailed enlarged view of a portion f of FIG. 1A.

Further, a front side (a circled portion "a" in FIG. 3B) of the bottom portion 38 of the rear console body 3 in the vehicle front-rear direction is formed into a shape that enables the rear console body 3 to deform by rotating around the front side of the bottom portion 38 when a given impact load H is applied to a portion other than a portion of the front side from above. As shown in FIG. 1C, the shape of the front side of the bottom portion 38 of the rear console body 3 is formed into an arc shape. Also, the shape of the front side of the rear console body 3 in the thickness direction is formed into an arc shape on an outer diameter side 38a and, for example, an angular shape on an inner diameter side 38b. The angular shape on the inner diameter side 38b may be a notch shape with a slit.

Next, actions and effects of the automotive rear console 1 according to the disclosure are described. Once an impact load H is applied to a rear portion of the rear console body 3 from above, the fragile portions 35 of the both left and right sides 33, 34 as well as the rear side 32 are broken, and the rear console body 3 is deformed as it rotates around the front side of the bottom, portion 38. Therefore, the entire bottom surface is able to absorb an impact. Further, in the fragile portions 35, the thin portions 36a in the cutout portions 36 that are thinner than the general portion of the rear console body 3 are formed in a wide range. Therefore, positions of the fragile portions where stress is applied are not concentrated on one point, thereby restraining the fragile portions from having stress concentration and stress release repeatedly.

Therefore, as shown in FIG. 3A, by setting the fragile portions 35 in the both right and left sides as well as the rear side of the bottom portion of the rear console body 3, respectively, a fastening pitch f in the vehicle width direction and a fastening pitch i in the vehicle front-rear direction can be set widely. Thus, as shown in FIG. 3C, it is possible to provide a high transverse rigidity g of the rear console body 3 at any position in the vehicle front-rear direction. Thus, it is possible to achieve contrary performances that are being able to set a wide range for the fragile portions 35, and getting high rigidity of the rear console body 3 against hand pushing.

Figure 4:
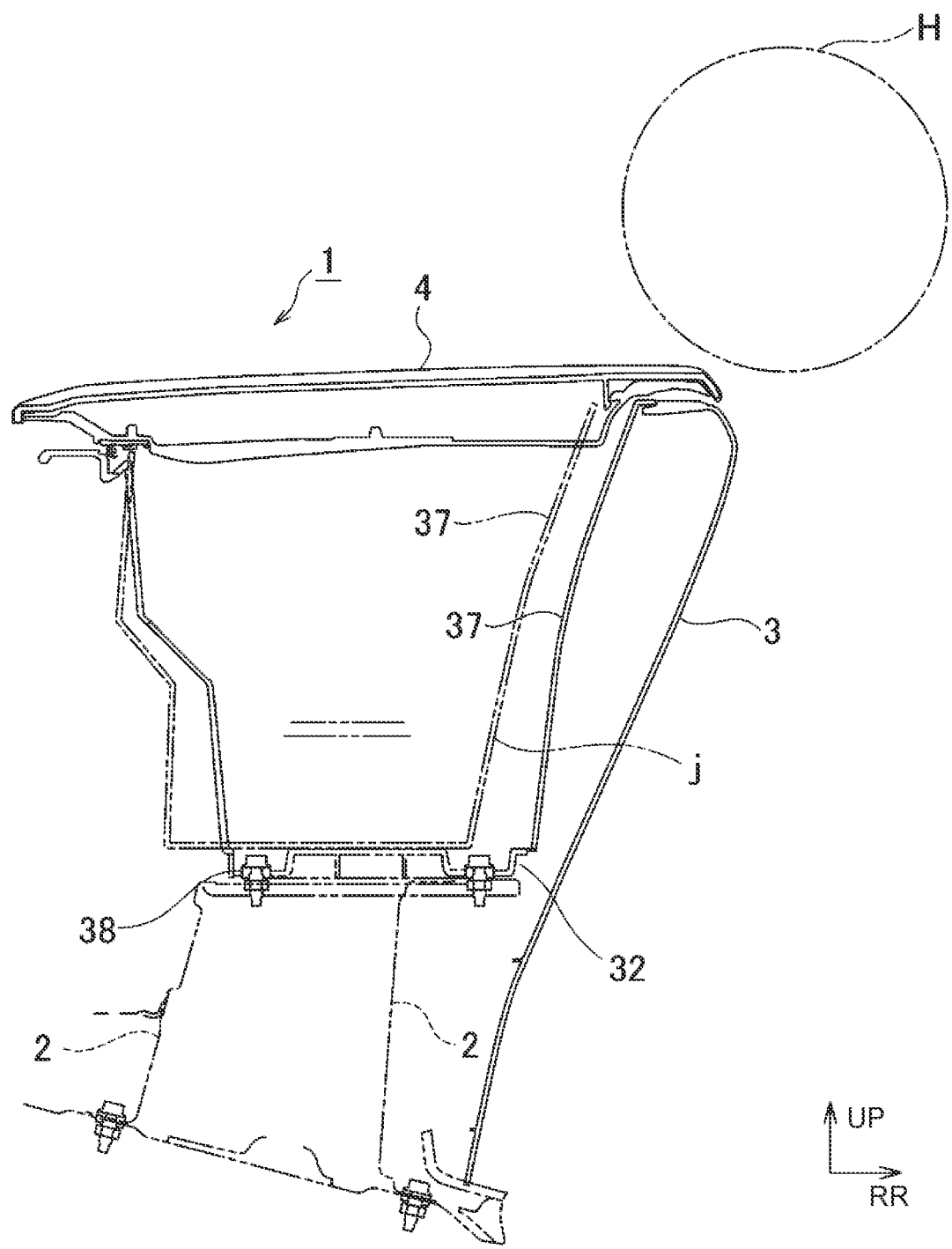
FIG. 4 is a view describing an acting state of the automotive rear console according to the disclosure, and is a sectional view of the automotive rear console from the left side surface.

Further, as shown in FIG. 38, because the front side of the bottom portion 38 of the rear console body 3 is set as a center of rotation, it is possible to stabilize a deformation mode of the fragile portions 35. When the fragile portions are provided in the entire circumference of the bottom portion of the rear console body 3, the rear console body 3 just shifts frontward as shown by a two dot chain line j in FIG. 4.

Moreover, since the automotive rear console 1 according to the disclosure is disposed on the floor part between the driver's seat and the passenger seat inside the cabin of the automobile, when occupants seated on the driver's seat and the passenger seat rest their elbows on the automotive rear console 1, the loads are applied to the front side of the bottom portion 38 of the rear console body 3 where the fragile portions 35 are not provided. Therefore, it is possible to restrain deterioration of the material.

Further, in the automotive rear console 1 according to the disclosure, the fragile portions 35 are set on the rear side and the both right and left sides of the bottom portion of the rear console body 3, respectively. Therefore, as shown in FIG. 3A, it is possible to set a collision area h widely.

Moreover, the thin portion 36a of the cutout portion 36 is optimized and set based on the deformation region and the material of the fragile portions 35 of the rear console body 3. Therefore, it is possible to improve design freedom for the rear console body 3. This means that a small thickness is set when the deformation range is narrow, and a large thickness is set when the deformation range is wide.

Further, the front side of the bottom portion 38 of the rear console body 3 in the vehicle front-rear direction is formed so that the rear console body 3 is able to deform by rotating around the front side of the bottom portion 38 when a given impact load H is applied to a portion other than the portion of the front side. Therefore, when the impact load H is applied to the rear portion of the rear console body 3 from above, and the fragile portions 35 in the rear side and the both right and left sides are broken, it is possible to deform the rear console body 3 stably by using the front side of the bottom portion 38 as the center of rotation.

Moreover, the bottom portion 38 of the front side of the rear console body 3 is formed into the arc shape, and the shape of the front side of the bottom portion 38 in the thickness direction is firmed so as to have the arc shape on the outer diameter side 38a and the angular shape on the inner diameter side 38b. Thus, it is possible to form the inner diameter side 38b so as to have an acute angle, and the rear console body 3 is thereby easily rotated around the front side of the bottom portion 38. The thinnest portion of the the front side of bottom portion 38 must be formed so as to be thicker than the thin portion 36a of the cutout portion 36. This is because, when the thickness of the front side of the bottom portion 38 is equal to or smaller than the thickness of the thin portion 36a of the cutout portion 36, it makes no difference from providing the fragile portion in the entire circumference of the bottom portion of the rear console body 3.

What is claimed is:

1. An automotive rear console comprising
a rear console body fixed to a bracket provided on a floor between a driver's seat and a passenger seat inside a cabin of an automobile, wherein:
the rear console body has a rectangular shape having a bottom portion;
the rear console body includes fragile portions provided in a rear side of the bottom portion in a vehicle front-rear direction, in one side of the bottom portion in a vehicle width direction, and in the other side of the bottom portion in the vehicle width direction;
the fragile portions are configured to be broken when impact load is applied from above the rear console body; and a front side of the bottom portion in the vehicle front-rear direction has a shape so that the rear console body deforms by rotating about the front side as a center of rotation when a given impact load is applied.

2. The automotive rear console according to claim 1, wherein:
the rear console body includes a general portion which is the other portion of the rear console body than the fragile portions;
each of the fragile portions has a cutout portion in which a sectional shape perpendicular to the bottom portion has a step shape; and
horizontal portion of the cutout portion has a thin portion with a thickness smaller than a thickness of the general portion.

3. The automotive rear console according to claim 2, wherein a thickness of the thin portion is set based on a size of a region of each of the fragile portions and a material of each of the fragile portions.

4. The automotive rear console according to claim 1, wherein a shape of the front side in a thickness direction has an arc shape on an outer diameter side and an angular shape on an inner diameter side.

5. The automotive rear console according to claim 1, wherein the rear console body includes:
a front surface in the vehicle front-rear direction;
a rear surface in the vehicle front-rear direction;
the bottom portion connecting a lower end of the front surface and a lower end of the rear surface;
a first side surface connecting an end of the front surface on one side in the vehicle width direction and an end of the rear surface on the one side in the vehicle width direction; and
a second side surface connecting an end of the front surface on the other side in the vehicle width direction and an end of the rear surface on the other side in the vehicle width direction.

6. The automotive rear console according to claim 1, wherein
the rear console body includes the fragile portions and a general portion which is other portion of the rear console body than the fragile portions, and
a strength against the impact load of each of the fragile portions is lower than a strength against the impact load of the general portion.

* * * * *

UNITED STATES PATENT AND TRADEMARK OFFICE
CERTIFICATE OF CORRECTION

PATENT NO. : 10,974,655 B2  
APPLICATION NO. : 16/424959  
DATED : April 13, 2021  
INVENTOR(S) : Kengo Kishimoto Page 1 of 1

It is certified that error appears in the above-identified patent and that said Letters Patent is hereby corrected as shown below:

In the Specification

In Column 1, Line(s) 36, delete "inroad" and insert --impact--, therefor.

In Column 2, Line(s) 13, after "impact", delete ",".

In Column 2, Line(s) 48, after "having", delete ",".

In Column 2, Line(s) 59, after "well", delete ",".

In Column 5, Line(s) 43, after "bottom", delete ",".

In Column 5, Line(s) 64, delete "38" and insert --3B--, therefor.

Signed and Sealed this  
Twenty-second Day of June, 2021

Drew Hirshfeld  
*Performing the Functions and Duties of the*  
*Under Secretary of Commerce for Intellectual Property and*  
*Director of the United States Patent and Trademark Office*